No. 831,888. PATENTED SEPT. 25, 1906.
G. C. NIENOW.
COUPLING POLE.
APPLICATION FILED JAN. 3, 1906.
2 SHEETS—SHEET 1.
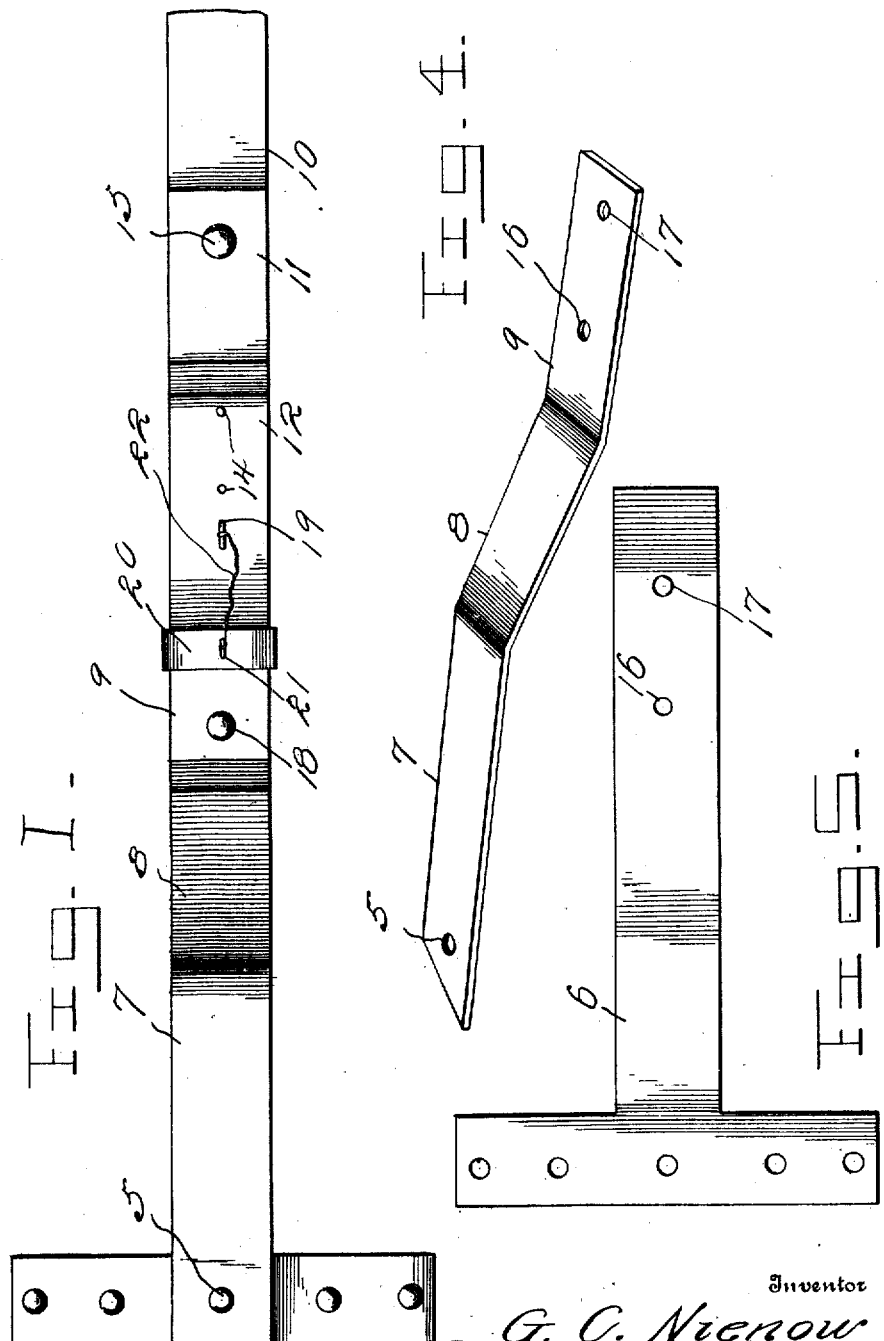

No. 831,888. PATENTED SEPT. 25, 1906.
G. C. NIENOW.
COUPLING POLE.
APPLICATION FILED JAN. 3, 1906.
2 SHEETS—SHEET 2.
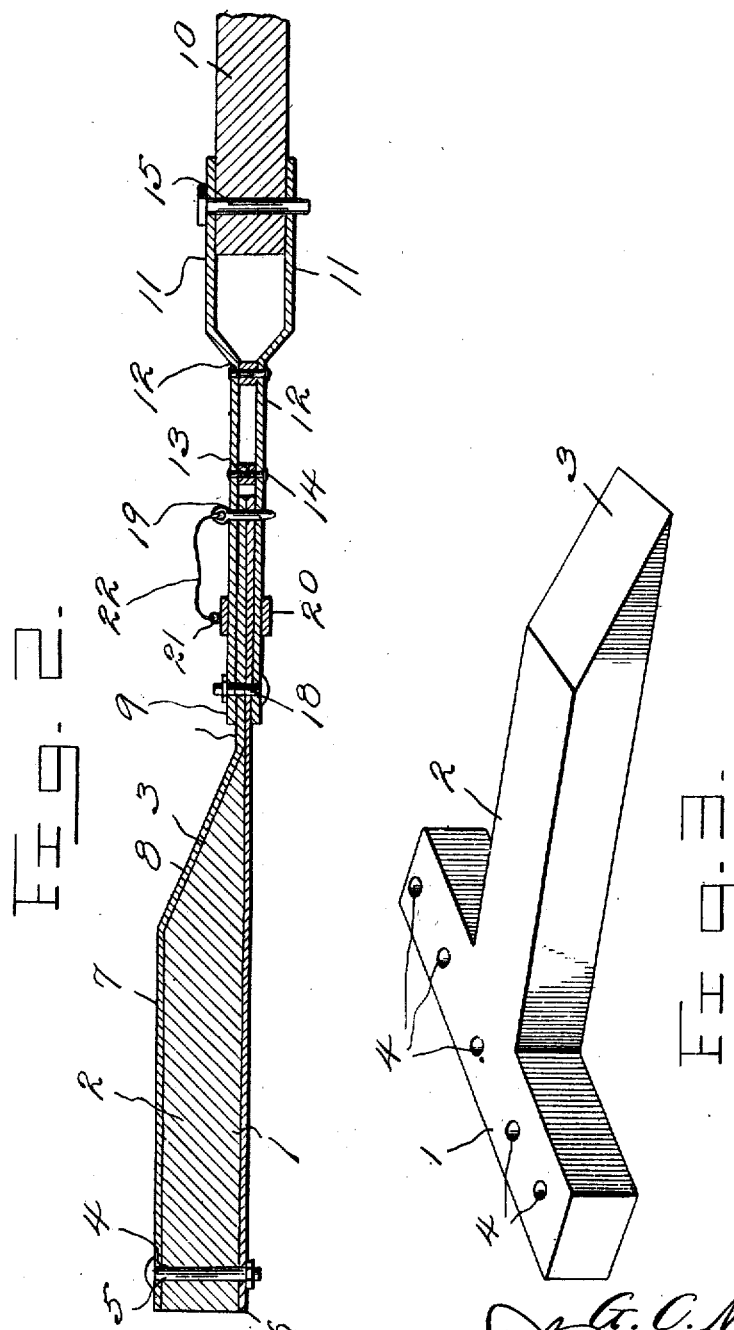

UNITED STATES PATENT OFFICE.

GEORGE C. NIENOW, OF PLAINVIEW, MINNESOTA.

COUPLING-POLE.

No. 831,888.  Specification of Letters Patent.  Patented Sept. 25, 1906.

Application filed January 3, 1906. Serial No. 294,445.

*To all whom it may concern:*

Be it known that I, GEORGE C. NIENOW, a citizen of the United States, residing at Plainview, in the county of Wabasha, State of Minnesota, have invented certain new and useful Improvements in Coupling-Poles; and I do hereby declare the following to be a full, clear, and exact description of the invention, such as will enable others skilled in the art to which it appertains to make and use the same.

This invention relates to couplings, and more particularly to that class of couplings which are used to couple an engine and a farm-machine or the like, and has for its object to provide a simple device of this character which may be readily and quickly operated and which will be efficient in action.

A further object of the invention is to provide a device of this character which may be swung into position to couple an engine and a machine even though the draft members of the same are not in alinement.

In the accompanying drawings, Figure 1 is a top plan view of my invention, showing the same removed from the engine and farm-machine. Fig. 2 is a vertical longitudinal sectional view through the same. Fig. 3 is a detail perspective view of the bolster and tongue of the threshing-machine or the like, and Figs. 4 and 5 are respectively detail views of the top and bottom tongue-plates.

Referring to the drawings, the numeral 1 denotes the bolster of a threshing-machine or other farm-machine, and 2 the tongue of the same, which has its forward end beveled, as at 3. The bolster 1 is provided with a series of openings 4, through which are engaged bolts 5, which serve to secure to the under side of the said bolster and the tongue a plate 6, which is T-shaped to conform to the shape of the said bolster and tongue. The central one of the bolts 5 also serves to secure to the tongue and bolster a tongue-plate 7, which is provided with a downturned portion 8 to lie against the beveled end 3 of the tongue 2, the remaining portion of the plate 7 being extended forwardly, as at 9, in a plane parallel to the plane occupied by the portion 7 of the said plate.

The draft element of the engine is indicated by the numeral 10, and disposed against the upper and lower sides of the draft member 10 are the inner ends of plates 11, each of which is bent at an angle and thence forwardly in parallel relation, as at 12. The last-named portion 12 of the plates 11 is held in spaced relation by means of sleeves 13, which are interposed between the said parallel portions of the said plates and which are engaged upon rivets or bolts 14, which serve to hold the said plates in fixed relation to each other. A headed pin 15 is engaged through alining openings in the inner ends of the plates 11 and in the draft member 10, whereby the said plates may be jointly swung with relation to said draft member.

The portions 12 of the plates 11 are sufficiently spaced for the reception of the outer ends of the plates 6 and 7, and the said portions 12 and the said plates are provided with alining openings 16 and 17 for the reception, respectively, of a bolt 18 and a pin 19. Slidably engaged around the meeting portions of the plates is a collar 20, carrying an eyelet 21, to which is attached one end of a flexible connection 22, attached at its opposite end to the pin 19.

In operation the collar 20 is moved upon the plates 11 in such a position that the forward end portions of the plates 6 and 7 will not strike the said collar when the plates 11 are swung with relation thereto. The plates 11 may then be swung into proper engagement with the draft member 10 of the engine and the pin 15 engaged through the said plates and the said draft member. As soon as tension is exerted upon the coupling the parts will assume their proper alinement, and the collar may be moved to its former position and the pin 19 properly seated to prevent turning of the members while the device is in use.

What is claimed is—

1. The combination with a pair of draft elements, of plates carried by said draft elements and pivotally connected to each other, and a collar slidably engaged with said plates.

2. The combination with a pair of draft elements, of plates carried by each of the draft elements, the ends of the plates for one draft element being received between the ends of the other draft element, a pivot-bolt engaged through the said ends of the plates to pivotally connect the same, and a pin adapted for engagement through the plates.

3. The combination with a pair of draft elements, of plates rigidly connected with one of said draft elements, plates pivotally connected to the other of said draft elements, the ends of the first-named plates being received between the ends of the second-named plates, and being pivotally connected, a collar slidably disposed upon the said plates, and a pin engaged through the said plates, the said collar and said pin being arranged to hold the said plates in fixed relation with respect to each other.

In testimony whereof I affix my signature in presence of two witnesses.

GEORGE C. NIENOW.

Witnesses:
  JAMES A. CASLEY,
  L. E. KLEIN.